Dec. 7, 1943.  H. B. MARIS  2,335,869
HIGH SPEED STRAIN GAUGE
Filed Nov. 29, 1941
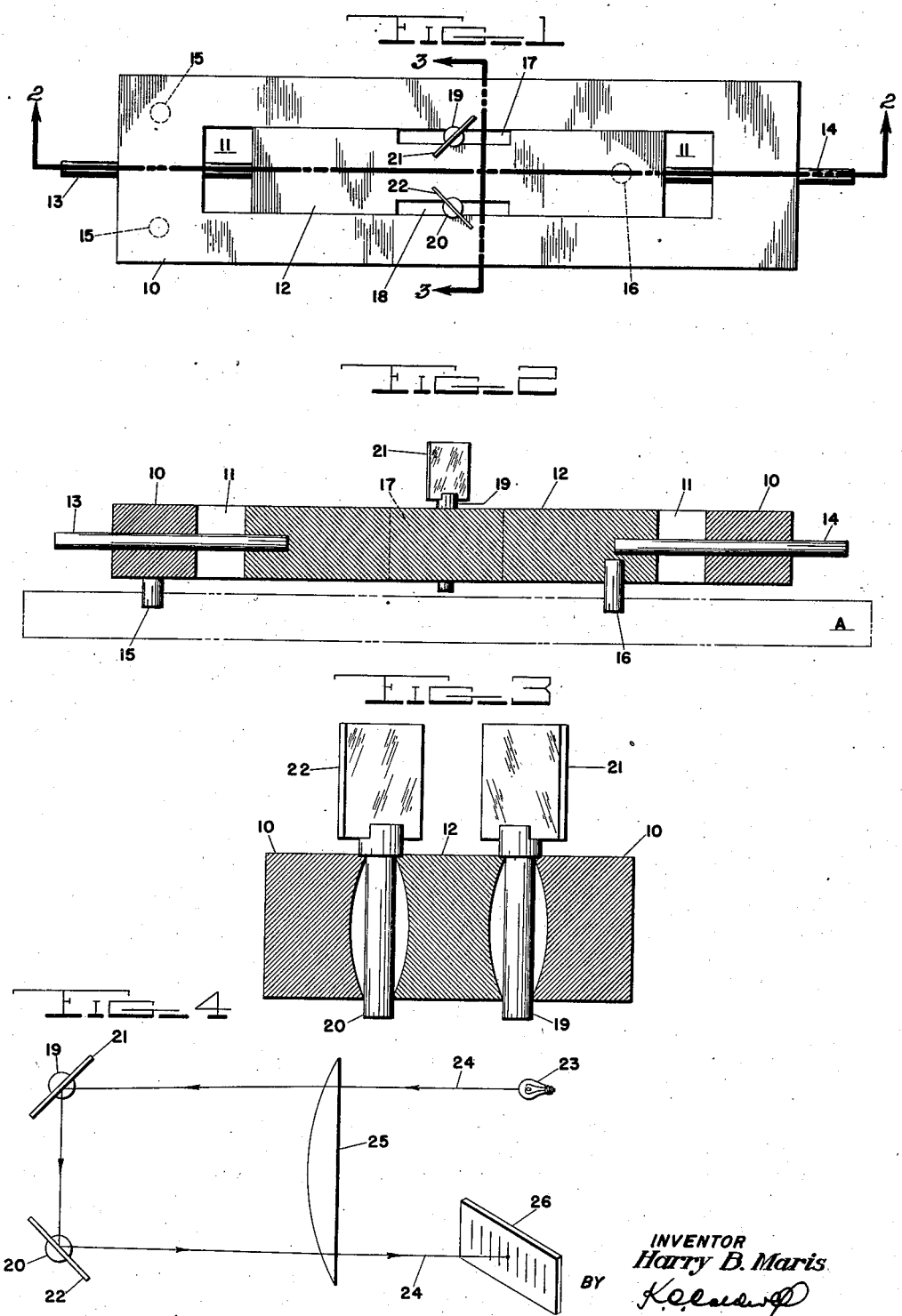
INVENTOR
*Harry B. Maris*
BY
*[signature]*
ATTORNEY Patented Dec. 7, 1943

2,335,869

UNITED STATES PATENT OFFICE 2,335,869

HIGH-SPEED STRAIN GAUGE

Harry B. Maris, Riverdale, Md.

Application November 29, 1941, Serial No. 421,058

11 Claims. (Cl. 33—147)

(Granted under the act of March 3, 1883, as amended April 30, 1928; 370 O. G. 757)

This invention relates to strain gauges and more particularly to instruments for accurately indicating minute movements at a high rate of speed.

Heretofore, strain gauges comprised a complex assembly of a plurality of intricate elements which are not only manufactured at a high cost but also are not reliable and accurate under all operating conditions. Moreover, since the prior strain gauges included a large number of elements and heavy framework therefor, the recording speed of such instruments is relatively low, due to the inertia effects encountered during operation. In some instances, strain gauges have been designed utilizing a comparatively small number of elements with lighter frames therefor; however, such designs were not successful since the instruments did not possess a high degree of accuracy and sensitivity, freedom from temperature or humidity effects and did not have sufficient strength and ruggedness to be utilized for indicating small movements under certain conditions.

It is therefore an object of the present invention to provide an instrument for measuring minute movements that overcomes the difficulties enumerated heretofore.

Another object is to provide a strain gauge comprising a minimum number of elements of rugged light-weight construction, which is free from temperature and humidity effects, for indicating minute movements at a high rate of speed.

Another object is to provide a strain gauge of novel design wherein the effects of inertia upon the operation thereof are reduced to a minimum.

Another object is to provide a strain gauge of the foregoing character having a novel optical system for producing a large amplification factor.

Another object is to provide a strain gauge of simple design which requires no mechanical adjustment for the zero or absolute reading.

Still another object of the invention is to provide a strain gauge of such design that the mass thereof is positioned adjacent the line of measurement and wherein substantially all components of force normal to the line of measurement are avoided whereby vibrations of the gauge are reduced to a minimum.

Still another object is to provide a strain gauge of the above type that may be easily manufactured at relatively low cost and that may be readily utilized in substantially all instances for rapidly indicating minute movements with a high degree of accuracy.

Other objects and features of the invention will appear more fully from the following detailed description when considered in connection with the accompanying drawing which discloses one embodiment of the invention. It is to be expressly understood, however, that the drawing is designed for purposes of illustration only and not as a definition of the limits of the invention, reference being had to the appended claims for the latter purpose.

In the drawing, wherein similar reference characters denote similar parts throughout the several views:

Fig. 1 is a plan view of a strain gauge constructed in accordance with the principles of the present invention;

Fig. 2 is a cross sectional view through line 2—2 of Fig. 1;

Fig. 3 is a cross sectional view through line 3—3 of Fig. 1, and

Fig. 4 is a diagrammatic showing of the optical system employed with the strain gauge disclosed in Fig. 1.

With reference more particularly to Figs. 1 and 2 a strain gauge embodying the principles of the present invention is disclosed therein including a rectangular frame 10, constructed of resilient material such as spring steel, having a rectangular slot 11 symmetrically cut therein. A rectangular member 12 is positioned in slot 11 for longitudinal movement therein, and a pair of guides 13 and 14 extend from opposite ends of member 12, through suitable openings in corresponding ends of frame 10, to maintain member 12 in alignment during movements thereof. A pair of legs 15 are positioned at one end of frame 10, while leg 16 is positioned on the opposite end of member 12, for positively contacting member A. When a change in length occurs in member A, upon application of a force thereto, relative movement, equal to the change in length of the member, will occur between frame 10 and member 12. In order to reduce vibration of the instrument, legs 15 and 16 are to be as short as possible to reduce applications of components of force normal to the line of measurement.

In order to transmit the relative movement between frame 10 and member 12 to an indicator to represent the change in length of the member A, means are provided for moving a beam of light, in proportion to relative movement between frame 10 and member 12, with a high amplification factor. As shown in Figs. 1 and 2 such means comprises a pair of grooves 17 and 18 diametrically cut in opposite sides of member 12. A pair of rollers 19 and 20 are positioned in grooves 17 and 18 respectively, and each are adapted to contact frame 10 and member 12 at diametrically opposed points thereon. Since frame 10 is constructed of spring steel, rollers 19 and 20 are maintained under a predetermined compression, the extent and purpose of which will appear more fully hereinafter. As shown in Fig. 3, the surfaces on member 12 and frame 10 which contact rollers 19 and 20 are hollow ground in order to maintain the alignment of rollers 19 and 20 as they roll in slots 17 and 18, in direct proportion to relative movement between frame 10 and member 12. Mirrors 21 and 22 are respectively carried by rollers on heads which also have guides for the rollers as shown by Figs. 2 and 3. The mirrors are adapted to rotate therewith to reflect a beam of light in proportion to the change in length of member A, as will appear more fully from the following description.

The optical system associated with the strain gauge described above is shown in Fig. 4. This optical system operates to amplify relative movements between frame 10 and member 12 and to indicate amplified movements on a suitable indicator whereby changes in length of a stressed member are obtained. As disclosed, the optical system includes a light source 23, which projects a beam of light, indicated by line 24, through lens 25 to the surface of mirror 21. The beam of light is reflected from mirror 21 to mirror 22, and from mirror 22 through lens 25 to a suitable indicator 26. It can be readily seen that when rollers 19 and 20 are rotated in opposite directions, upon relative movement between frame 10 and member 12, mirrors 21 and 22 will likewise rotate in opposite directions to deflect the beam of light in a certain direction, directly proportional to the extent of rotation of the mirrors. The beam is reflected from the first lens with a change equal to twice the rotation of the mirror and from the second lens with a change four times the rotation. The final amplification at 26 is four times the distance from 20 to 26 divided by the diameter of the rollers. A single mirror may be employed to give half this amplification.

As heretofore stated, the strain gauge disclosed by the present invention is of such design to substantially obliterate the effects of inertia on the operation thereof to thus allow the instrument to operate at a high rate of speed. To more fully appreciate the above advantageous results flowing from the novel construction described heretofore, the operation of a strain gauge constructed in accordance with the foregoing principles will be noted. The strain gauge had a gauge length of 2.2 inches and weighed 0.013 pound, the moving portion, namely member 12, having a weight of 0.004 pound. The roller diameter was 0.02 inch and the distance from the mirrors to the screen was 10 inches. The gauge was properly positioned on a sample of steel which has a deflection of 0.00022 inch when a load of 3,000 pounds per square inch is applied thereto. The deflection of 0.00022 inch of the steel caused relative movement of 0.00022 inch between frame 10 and member 12 which resulted in a certain rotation of mirrors 21 and 22 which caused the light beam to deflect 0.44 inch on indicator 26. The relative movement between frame 10 and member 12 was thus amplified approximately 2000 times and the indications were found to be accurate within 1%. The speed that the instrument indicated the deflection of 0.00022 inch was readily calculated as follows:

If a force of 1 pound were applied to the moving member 12, which weighs 0.004 pound, the acceleration of such member would be $$32 \times 12 \times 1/0.004$$

which equals 96,000 inches per second. Since member 12 travels 0.00022 inch, the time required for moving member 12 such distance is derived from the formula, $d = \frac{1}{2} at^2$; where $$t = 0.00044/96{,}000$$
$$= 0.46 \times 10^{-8}$$

and $$t = 0.7 \times 10^{-4} \text{ second}$$

From the above it can be readily seen that a lag of approximately $\frac{1}{10000}$ of a second will be present between the application of 3000 pounds per square inch to the steel and the subsequent deflection of 0.44 inch of the light ray on indicator 26. The foregoing calculations were made while assuming that the force of one pound was applied directly to member 12. In actual operation the force applied to move member 12 will be a component of the force applied to the stress member and will be transmitted to member 12 through legs 15 and 16. The transmission of the force through legs 15 and 16 requires a certain period of time which causes a corresponding decrease in the recording speed of the instrument. As stated heretofore, legs 15 and 16 are to be as short as possible to provide substantially rigid connections between the instrument and the member to be stressed in order to reduce applications of any component of force normal to the line of measurement. Such construction reduces the possibility of deflections occurring in the instrument, as well as reducing the lag in time between the application of a load to the stress member and subsequent deflection of the light ray on indicator 26.

The sensitivity of the strain gauge depends upon the diameter of rollers 19 and 20. When rollers of very small diameter are utilized a large amplification factor is obtained and consequently the deflection of the light beam on indicator 26 will be very large. However, the utilization of rollers of very small diameter will not provide an instrument which operates at the highest degree of speed and accuracy since it is quite difficult to place very small rollers under sufficient compression to prevent slipping between the contacting surfaces of the rollers, frame 10 and member 12, upon relative movement between the frame and the member. For this reason the rollers must be of a predetermined diameter in order to obtain optimum results. With reference again to the strain gauge mentioned heretofore, rollers having a diameter of 0.02 inch were employed therein. With rollers of such diameter a maximum contact pressure of 10,000 pounds per square inch on each of the rollers was readily obtained by applying an average pressure of 1 pound on each of the rollers from the spring characteristics of frame 10. With a pressure of 10,000 pounds per square inch on each of the rollers it was found that the rollers rotated in direct proportion to relative movement between frame 10 and member 12 without apparent slippage between the contacting surfaces. The increased size of the rollers does not materially effect the speed of response since the inertia effects of the rollers is substantially nil. The weight of the rollers is approximately $\frac{1}{10}$ of the weight of member 12, and since the rollers will move only $\frac{1}{2}$ the distance that member 12 moves, the lag between the application of the stress and the deflection of the light beam at indicator 26, due to the inertia effect of the rollers, will be approximately 1/100000 of a second. Such a minute lag in time will not materially effect the advantageous advantages of a strain gauge embodying the novel principles mentioned heretofore.

There is thus provided by the present invention an instrument for measuring minute movements which is of novel design and construction employing a minimum number of light weight elements whereby rapid indications are obtained. The instrument is designed in such a manner that effects of inertia upon the operating speed of the instrument are reduced to a minimum and that substantially all components of force normal to the line of measurement have been eliminated to thus reduce vibrations thereof. Moreover, the present invention provides a strain gauge that is of light weight, rugged construction free from temperature and humidity effects, and therefore may be utilized in numerous instances, under practically all circumstances, for rapidly indicating small movements with a high degree of accuracy.

Although only one embodiment of the invention has been disclosed and described in detail heretofore, it is to be expressly understood that various changes and substitutions may be made therein without departing from the spirit of the invention as well understood by those skilled in the art. Reference therefore will be had to the appended claims as a definition of the limits of the invention.

The invention described herein may be manufactured and used by or for the Government of the United States of America for governmental purposes without the payment of any royalties thereon or therefor.

What is claimed is:

1. In an instrument for measuring small movements at a high rate of speed, a frame of resilient material having a slot therein, a member slidably mounted in said slot, said member having a pair of grooves in the edges thereof slidably contacting the edges of said slot, a roller positioned in each of said grooves having contacts with said member and said frame, said contacts being under a predetermined pressure from said frame whereby said rollers positively rotate upon relative movement between said frame and said member, and means associated with each of said rollers for amplifying and indicating said relative movement.

2. In a high speed strain gauge, a frame of resilient material having a rectangular slot therein, a rectangular member slidably mounted in said slot with substantially no inertia effects opposing movement thereof, said member having a pair of grooves in the edges thereof slidably contacting the edges of said slot, means positioned on opposite ends of said frame and said member for contacting a member to be stressed, a roller positioned in each of said grooves, said rollers contacting said frame and said member and being under pressure from said frame whereby said rollers rotate in direct proportion to deflection of said stressed member when a force is applied thereto, and means associated with said rollers for amplifying and indicating movements of said rollers.

3. In an instrument for measuring small movements at a high rate of speed, a frame of resilient material having a slot therein, a member slidably mounted in said slot, said member having a pair of grooves in the edges thereof slidably contacting the edges of said slot, a roller positioned in each of said grooves having contacts with said member and said frame, said contacts being under a predetermined pressure from said frame whereby said rollers positively rotate upon relative movement between said frame and said member, a mirror positioned on each of said rollers, means impinging a light ray on one of said mirrors from which the ray is reflected to the other mirror, and means directing the ray reflected from said other mirror to an indicator for indicating said relative movement.

4. In a high speed strain gauge, a pair of members, having aligning longitudinal axes and being relatively slidable in the direction of said longitudinal axes, means on said members for contacting the work to be stressed, and spacing said members equally close to the work whereby substantially all force applied to said members when a force is applied to said work to be stressed are substantially parallel to the longitudinal axis of said members, means contacting said members in such a manner as to rotate in direct proportion to relative movement between said members, and means associated with last named means for indicating said relative movement.

5. In an instrument for measuring small movements at a high rate of speed, a frame of resilient material having a slot therein, a member slidably mounted in said slot, said member having a pair of grooves in the edges thereof slidably contacting the edges of said slot, a roller positioned in each of said grooves having contacts with said member and said frame, the diameters of said rollers being of a predetermined size so that the rollers are maintained under a substantially high pressure from a substantially small force applied thereto from said frame whereby said rollers positively rotate upon relative movement between said frame and said member, and means associated with each of said rollers for amplifying and indicating said relative movement.

6. In a high speed strain gauge, a frame of resilient material having a rectangular slot therein, a rectangular member slidably mounted in said slot with substantially no inertia effects opposing movement thereof, said member having a pair of grooves in the edges thereof slidably contacting the edges of said slot, means positioned on an opposite end of said frame and said member for contacting a member to be stressed, a roller positioned in each of said grooves, the diameters of said rollers being of a predetermined size so that the rollers are maintained under a substantially high pressure from a substantially low force applied thereto from said frame whereby said rollers positively rotate upon relative movement between said frame and said rectangular member, and means associated with each of said rollers for amplifying and indicating said relative movement.

7. In an instrument for measuring small movements at a high rate of speed, a frame of resilient material having a slot therein, a member slidably mounted in said slot, said member having a pair of grooves in the edges thereof slidably contacting the edges of said slot, a roller positioned in each of said grooves having contacts with said member and said frame, the diameters of said rollers being of sufficient size so that the rollers are maintained under a substantially high pressure from a substantially low force applied thereto from said frame whereby the rollers positively rotate upon relative movement between said frame and said member, a mirror positioned on each of said rollers, means impinging a light ray on one of said mirrors from which the ray is reflected to the other mirror, and means directing the ray reflected from said other mirror to an indicator for indicating said relative movement.

8. In a high speed strain gauge, a frame of resilient material having a slot therein, a rectangular member slidably mounted in said slot, said member having a pair of grooves in the edges thereof slidably contacting the edges of said slot, means on said frame and said rectangular member for contacting a member to be stressed, said means positioned on said member and said rectangular member in such a manner that substantially all forces applied to said frame and said member when a force is applied to said member to be stressed are substantially parallel to said member to be stressed, a roller positioned in each of said grooves having contacts with said member and said frame, said contacts being under a predetermined pressure from said frame whereby said rollers positively rotate in direct proportion to relative movement between said frame and said member, and means associated with each of said rollers for amplifying and indicating said relative movement.

9. In an instrument for measuring small movements at a high rate of speed, a frame of resilient material having a slot therein, a member slidably mounted in said slot, said member having a pair of grooves in the edges thereof slidably contacting the edges of said slot, and a roller positioned in each of said grooves having contacts with said member and said frame, said contacts being under a predetermined pressure from said frame whereby said rollers positively rotate in direct proportion to relative movement between said frame and said member.

10. In a high speed strain gauge, a frame of resilient material having a slot therein, a member slidably mounted in said slot, said member having a pair of grooves in the edges thereof slidably contacting the edges of said slot, means positioned on opposite ends of said frame and said member for contacting a member to be stressed, and a roller positioned in each of said grooves, said rollers contacting said frame and said member and being under pressure from said frame whereby said rollers rotate in direct proportion to elongation of said member to be stressed when a force is applied thereto.

11. In a strain gauge, a first member provided with an elongate slot and having an inner longitudinal wall portion, a second member disposed in alignment with the first member and mounted for reciprocation in the slot, said second member having a longitudinal wall portion disposed in spaced parallel relation to the wall portion of said first member, means spacing said members equally close to the work comprising contacts of equal lengths, said contacts spaced in the direction of reciprocation of said second member in said slot, a roller fitting between said wall portions for angular movement upon reciprocation of said members, and means for indicating the angular movement of said roller.

HARRY B. MARIS.